May 24, 1927.

E. P. RENAUX 1,629,532

SERVO EXPANDED BRAKE

Original Filed March 14, 1923

INVENTOR
EUGENE P. RENAUX
BY
M. W. McConkey
ATTORNEY

Patented May 24, 1927.

1,629,532

UNITED STATES PATENT OFFICE.

EUGÈNE PROSPER RENAUX, OF PARIS, FRANCE, ASSIGNOR TO BENDIX BRAKE COMPANY, OF CHICAGO, ILLINOIS, A CORPORATION OF ILLINOIS.

SERVO-EXPANDED BRAKE.

Original application filed March 14, 1923, Serial No. 625,072. Divided and this application filed April 15, 1926. Serial No. 102,140.

This invention relates to brakes and is illustrated as embodied in an internal expanding automobile brake.

An object of the invention is to provide a simple servo mechanism for operating a brake of this general character and preferably including a separate drum engaged by the servo shoe which is arranged co-axially with respect to the brake drum. In one desirable arrangement the two co-axial drums are arranged one inside the other with two sets of friction means, one of which is engageable with the inside of the outer drum and one of which is engageable with the outside of the inner drum, and one of which acts as a servo device to operate the other. Preferably the shoes or other friction means are expanded against the outer drum by a cam or the like having a radial arm extending inwardly and engaged by a servo shoe operated by frictional engagement with the outside of the inner drum.

Various features of novelty relate to the operation of the servo shoe by inter-connected spaced applying devices and to supporting the servo shoe by means of return springs connected to the outer brake shoes. The advantages of these constructions and various additional features of novelty and desirable particular constructions will be apparent from the following description of one illustrative embodiment shown in the accompanying drawings, in which.

Figure 1:
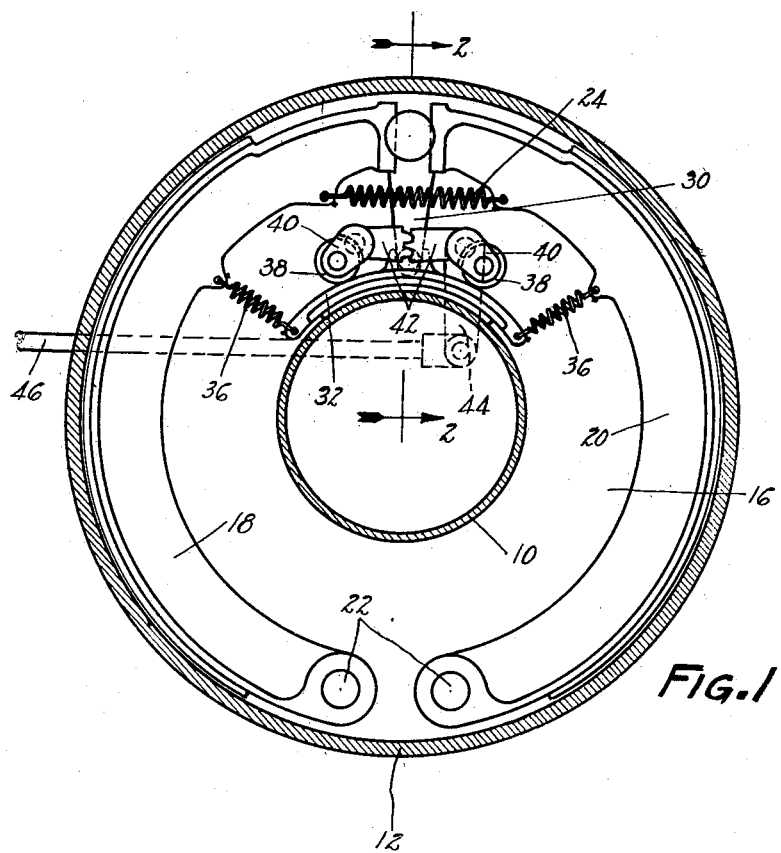
Figure 1 is a vertical section through the brake just inside the head of the brake drums.
Figure 2:
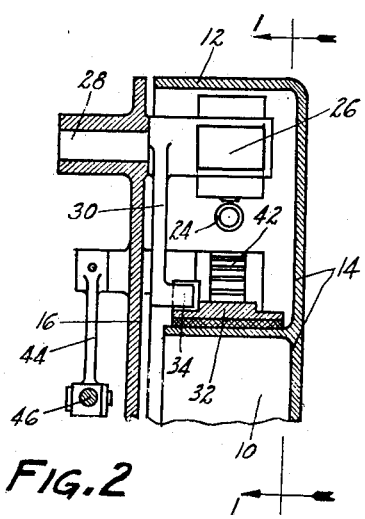
Figure 2 is a partial vertical section on the line 2—2 of Figure 1, and showing the relation of the two drums.

The illustrated brake includes an inner drum 10 and an outer drum 12 shown integral with the same head 14 and both of which are closed at their open sides by a suitable support such as a backing plate 16.

The friction means which engages the inside of the outer drum 12 may be a pair of shoes 18 and 20 anchored at the bottom of the drum by being mounted on pivots 22 carried by the backing plate 16. The upper or unanchored ends of these shoes are connected by a return spring 24 which resists the application of the brake by means such as a double cam 26 carried by a spindle 28 journalled in the backing plate 16 and having an operating arm 30 projecting radially inward.

Immediately opposite the unanchored ends of the shoes 18 and 20 there is arranged a servo shoe 32 engageable with the outside surface of the inner drum 10 and formed with a notch operatively embracing a projection 34 on the inner end of the lever 30 so that movement of the servo shoe 32 in either direction with drum 10 rocks the lever 30 to force shoes 18 and 20 apart against the drum 12. The servo shoe 32 may advantageously be supported at its opposite ends by a pair of radial springs 36 connecting it to the adjacent parts of the shoes 18 and 20 and which not only support the servo shoe but serve also as return springs urging it away from the drum 10. The servo shoe 42 may be forced against the drum 10 by novel inter-connected applying devices such as rollers 38 carried by crank arms 40 and operatively connected by inter-meshing gear or rack segments 42 and rocked by an arm 44 operated by the usual brake-operating connections 46.

When the brake is applied the rollers 38 permit the shoe 32 to shift a substantial distance lengthwise or circumferentially of the drum 10 in one direction or the other to apply the shoes 18 and 20. When the brake is released the springs 36 immediately pull the shoe 32 away from the drum 10 while the spring 24 has the double function of pulling the shoes 18 and 20 away from the drum and swinging the lever 30 to return the shoe 32 to its central or initial position.

While one illustrative embodiment of the invention has been described in detail, it is not my intention to limit its scope to that particular embodiment or otherwise than by the terms of the appended claims. Most of the subject-matter herein claimed is to be regarded as divided from my prior application No. 625,072, filed March 14, 1923.

I claim:

1. A brake comprising, in combination, a pair of substantially co-axial drums arranged one within the other, friction means engageable with the inner surface of the outer drum, and a servo shoe engageable with the outer surface of the inner drum and operable to force the friction means against the outer drum.

2. A brake comprising, in combination, a pair of co-axial drums arranged one within the other, friction means expansible against the inner surface of the outer drum, friction means engageable with the outer surface of the inner drum, and connections operated by one of said means to operate the other of said means.

3. A brake comprising, in combination, a pair of co-axial drums, a friction device expansible against the inner surface of the outer drum and having adjacent free ends, a servo shoe engageable with the outer surface of the inner drum, and an expanding device engaging said free ends and having an operating arm extending substantially radially of the drums and engaged by the servo shoe.

4. A brake comprising, in combination, a pair of co-axial drums, expansible friction means engageable with the inner surface of the outer drum and formed with adjacent free ends, a servo shoe engageable with the outer surface of the inner drum, a cam engaging said adjacent free ends, and an operating arm for the cam extending substantially radially inward of the drum and engaged by said servo shoe.

5. A brake comprising, in combination, a pair of substantially co-axial drums, shoes engageable with the inner surface of the outer drum and having adjacent free ends, a servo shoe opposite said free ends engageable with the outer surface of the inner drum and arranged to force said shoes apart against the outer drum, and springs connecting the ends of the servo shoe to the pair of shoes and urging the servo shoe away from the inner drum.

6. A brake comprising, in combination, a pair of co-axial drums, friction means engageable with the inside of the outside drum, a servo shoe engageable with the outside of the inner drum and arranged to expand said friction means, and a pair of spaced inter-connected applying devices for forcing the servo shoe against the inner drum.

In testimony whereof, I have hereunto signed my name.

EUGÉNE PROSPER RENAUX.